United States Patent

Ostrcil

[19]

[11] Patent Number: 5,809,127
[45] Date of Patent: Sep. 15, 1998

[54] METHOD AND APPARATUS FOR REMOTE CONTROL INFLUENCING OF ISDN PERFORMANCE FEATURES

[75] Inventor: Richard Ostrcil, Vienna, Austria

[73] Assignee: Siemens Aktiengesellschaft, Munich, Germany

[21] Appl. No.: 686,590

[22] Filed: Jul. 26, 1996

[30] Foreign Application Priority Data

Aug. 4, 1995 [DE] Germany .................. 195 28 732.0

[51] Int. Cl.⁶ .................................................. H04M 3/42
[52] U.S. Cl. .................... 379/201; 379/102.02; 379/229; 370/264; 370/904
[58] Field of Search ................................... 379/201, 211, 379/212, 215, 207, 219, 220, 221, 93.28, 229, 230, 74, 102.01, 102.02; 370/904, 264, 410, 524

[56] References Cited

U.S. PATENT DOCUMENTS

| | | | |
|---|---|---|---|
| 5,291,492 | 3/1994 | Andrews et al. | 370/904 |
| 5,347,573 | 9/1994 | Wilde | 379/201 |
| 5,422,942 | 6/1995 | Kakwashima | 379/412 |
| 5,446,740 | 8/1995 | Yien et al. | 370/904 |
| 5,553,146 | 9/1996 | Flake | 380/48 |
| 5,600,654 | 2/1997 | Brown et al. | 379/215 |
| 5,632,017 | 5/1997 | Klein et al. | 379/93.28 |

FOREIGN PATENT DOCUMENTS

| | | |
|---|---|---|
| 0 487 811 A1 | 6/1992 | European Pat. Off. . |
| 0 588 571 A2 | 3/1994 | European Pat. Off. . |
| 2 289 825 A | 11/1995 | United Kingdom . |
| WO 95/09505 | 6/1995 | WIPO . |

OTHER PUBLICATIONS

Patent Abstracts of Japan, E–1559, Jun. 10, 1994, vol. 18, No. 305, ISDN Telephone System, Akira Inoue, JP 6–62128 A2, Mar. 4, 1994.
Patent Abstracts of Japan, E–996, Oct. 29, 1990, vol. 14, No. 496, Communication Transferring System, Kiyoshi Kabetani,JP 2–206270 (A), 16 Aug. 1990.

*Primary Examiner*—Krista Zele
*Assistant Examiner*—Scott Wolinsky
*Attorney, Agent, or Firm*—Hill & Simpson

[57] ABSTRACT

In the method, a call setup in an ISDN communication network (ISDN) is initiated from a further communication terminal equipment (KEX) to a communication terminal equipment (KE) whose performance features are to be influenced. At least one setting information (esi) that influences a performance feature as well as an activation signal (aki) is communicated to the communication terminal equipment (KE) via a user—user information element (uui) that is standardized in the draft prETS 300 286 and inserted into the ISDN signaling information (si), and the call setup is subsequently ended. Initiated by the activation information (aki) and during the set up connection or after the cleardown of the connection, the respective performance feature of a service is automatically influenced in the communication terminal equipment (KE) according to the communicated setting information (esi). A remote control of performance features of services in ISDN communication networks is possible with the method.

17 Claims, 1 Drawing Sheet

METHOD AND APPARATUS FOR REMOTE CONTROL INFLUENCING OF ISDN PERFORMANCE FEATURES

BACKGROUND OF THE INVENTION

In ISDN (Integrated Services Digital Network) communication networks, performance features of a service such as, for example, call redirection or consultation (hold for inquiry) in the telephone service can be set by actuation of keys on ISDN communication terminal equipment. In a realization of the performance features in the ISDN communication terminal equipment, the respective performance feature is directly initialized or modified or, respectively, set by the key inputs. In an alternative realization of the performance features in the allocated ISDN communication system, that is, the ISDN communication line unit, signaling messages corresponding to the key actuations are formed and communicated to the allocated communication system over the ISDN signaling channel (known as D-channel in the technical field). The ISDN communication terminal equipment is connected to the communication system via a subscriber line. A respective ISDN interface (for example, the SO-interface) has two message channels of 64 kbit/s each and a signaling channel with 16 kbit/s and is located between the communication system and the ISDN communication terminal equipment. The ETSI Standards (ETS 300 012, ETS 300 125, ETS 300 196 and ETS 300 102) define the procedural and physical properties of the ISDN interfaces. The ISDN standards also cover the procedures required for the control of the performance features or, respectively, the signaling information to be formed in the ISDN communication terminal equipment or in the ISDN communication system and to be communicated. The realization of the key occupation and allocation, however, remains individually associated to a communication terminal equipment. The settings or, respectively, modifications of performance features of an ISDN communication terminal equipment can only be initialized or, respectively, implemented in the respectively affected ISDN communication terminal equipment itself, since control of performance features proceeding from a different ISDN communication terminal equipment is not possible in the ISDN communication network. This means that, for example, the call redirecting can only be modified by an ISDN communication terminal equipment at its "own" ISDN communication network terminal or, respectively, the redirection telephone number cannot be rerouted under remote control given a further change in location. This limitation is also valid for a call redirecting with the supplementary service "Call Deflection" recited in the ETSI standard (see pr ETS 300 207 with respect thereto) initiated by the ISDN communication terminal equipment.

SUMMARY OF THE INVENTION

It is an object of the present invention to provide a method for remote control of service-associated performance features in the ISDN communication network.

In general terms the present invention is a method for remote control influencing of performance features for ISDN communication terminal equipment in an ISDN communication network respectively connected to ISDN communication systems via an ISDN communication network connection.

The call setup and cleardown are controlled by signaling information communicated via the ISDN communication network connection. A call setup is initiated from a further communication terminal equipment to a communication terminal equipment whose performance features are to be modified. A user—user information element inserted into the signaling information communicates at least setting information that influences a respective service as well as activation information to the communication terminal equipment and the call setup is subsequently ended. Initiated by the activation information, influencing of a respective performance feature of the respective service is automatically initialized in the communication terminal equipment corresponding to the communicated setting information.

Advantageous developments of the present invention are as follows.

Initiated by the activation information, signaling information is automatically formed after call cleardown for influencing the performance features and is communicated to the communication system allocated thereto. The information that is inserted into the user—user information element and that influences the performance features is formed according to the communicated setting information.

Initiated by the activation information, the respective performance feature is automatically influenced in the communication terminal equipment after the call cleardown according to the communicated setting information.

During the set up connection or in the framework of the call setup, the further ISDN communication terminal equipment is informed of the storing of the communicated setting information in the further ISDN communication terminal equipment by communicating result information inserted into a user—user information element of the signaling information.

Initiated by the activation information and during the set up connection, signaling information is automatically formed for influencing the performance features and is communicated to the communication system allocated thereto. The information that is inserted into the user—user information element and that influences the performance features is formed according to the communicated setting information.

Initiated by the activation information and during the set up connection, the respective performance feature is automatically influenced in the communication terminal equipment (KE) according to the communicated setting information.

During the set up connection or in the framework of the call setup, the further ISDN communication terminal equipment is informed of the successful or unsuccessful setting of a performance feature by result information inserted into a user—user information element of the signaling information.

The setting information is represented by; service information that indicates the service affected, performance feature information that indicates the performance feature to be set, and performance feature setting information that indicates the setting of the respective performance feature.

The setting information is encoded for information compression, is communicated and decoded in the specific communication terminal equipment.

The setting information relates to the performance feature of call redirecting in the telephone service. The telephone service is defined by the service information, the performance feature of call redirecting is defined by the performance feature information and the call redirection telephone number is defined by the performance feature setting information.

The signaling information and the user—user information element are formed according to the standard ETS 300 286.

The present invention is also a communication terminal equipment for remote control influencing of performance features, ISDN communication terminal equipment units in an ISDN communication network are ISDN communication terminal equipment units that are respectively connected to ISDN communication systems via an ISDN communication network connection. An insertion routine and a performance feature routine is respectively provided in the ISDN communication terminal equipment units and fashioned such that: the call setup and cleardown are controlled by signaling information communicated via the ISDN communication network connection; a call setup is initiated from a further communication terminal equipment to a communication terminal equipment whose performance features are to be modified, whereby a user—user information element inserted into the signaling information communicates at least setting information that influences a service as well as activation information to the communication terminal equipment and the call setup is subsequently ended; and initiated by the activation information, the influencing of the respective performance feature of the respective service is automatically initialized in the communication terminal equipment corresponding to the communicated setting information.

An important aspect of the inventive method is that, using the user—user information element defined in the ETSI Recommendation Draft pr ETS 300 286, Chap.7.3, activation information and setting information is communicated during the course of a call setup from an arbitrary ISDN communication terminal equipment to a specific, that is, to the ISDN communication terminal equipment of its "own" ISDN communication network terminal, and the indicated performance feature of the respective service is automatically set according to the communicated setting information. The automatic setting initiates the activation information during the setup connection or after the call cleardown either in the ISDN communication terminal equipment itself or on the basis of a signaling to the allocated ISDN communication system. Given a signaling, signaling information are formed according to the communicated setting information and are communicated to the allocated ISDN communication system. Given the performance feature of call redirection in the telephone service, the telephone number of the ISDN communication terminal equipment to which the incoming connection requests for a specific service, for example the telephone service, are to be redirected is communicated by remote control to the ISDN communication system, for example by a signaling.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
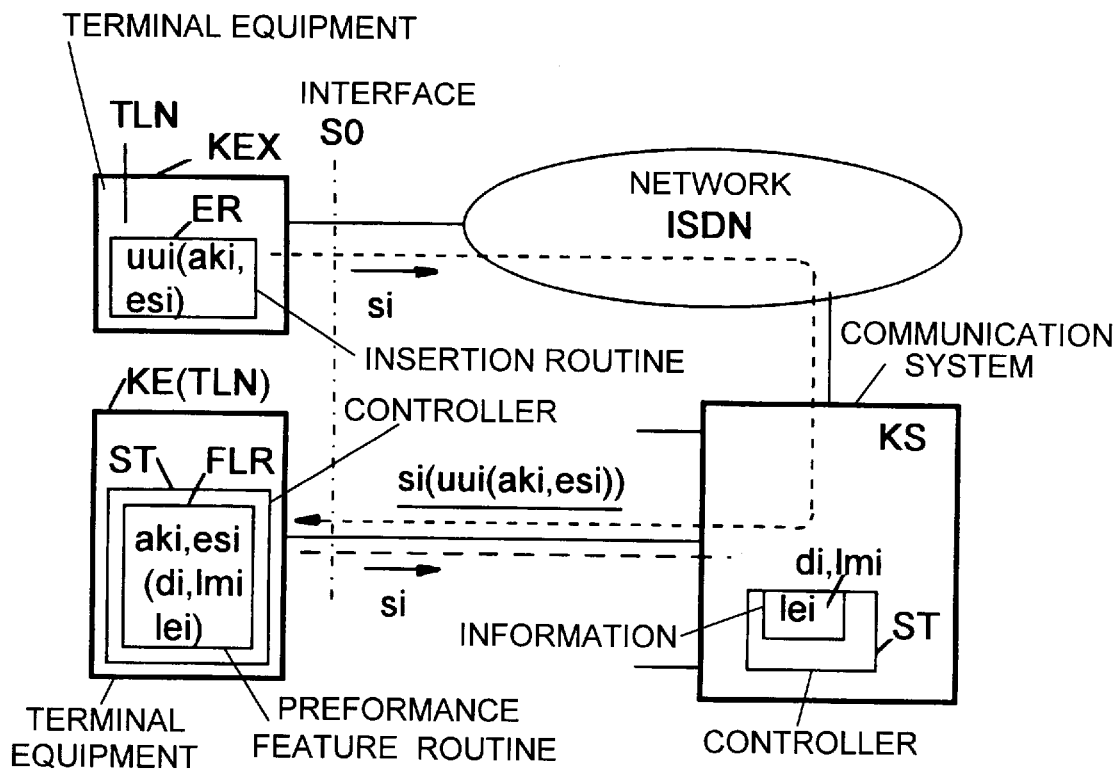
FIG. 1 is an ISDN communication network in a block circuit diagram.

FIG. 1 shows an ISDN communication system KS that has a connected ISDN communication terminal equipment KE (represented by one of a plurality of connected ISDN communication terminal equipment units by way of example) and that is connected to an ISDN communication network ISDN. Also shown is a further ISDN communication terminal equipment KEX that is connected to the ISDN communication network ISDN. The further ISDN communication terminal equipment KEX is connectable to the ISDN communication terminal equipment KE via the ISDN communication network ISDN. The connection of the ISDN communication terminal equipment units KE, KEX respectively ensues via an SO interface SO (representing a respective ISDN communication network connection SO) whose physical and procedural properties are defined by the European Telecommunication Standards ETS 300 112, ETS 300 125, ETS 300 196 and ETS 300 102. The European Telecommunication Standards (ETS) are based on the CCITT Recommendations of the I-Series for ISDN communication networks. In the exemplary embodiment, the ISDN communication terminal equipment KE is allocated to an ISDN subscriber TLN and the performance features of "call redirection" is activated using the controller ST thereof, that is, incoming calls for a specific service are redirected to an ISDN communication terminal equipment (not shown). The performance feature is set up and activated by communicating signaling information (not shown) to its proper ISDN communication network connection SO or, respectively, the allocated ISDN communication system KS. That is, the performance feature is set up and controlled by a controller of the allocated ISDN communication system KS. The signaling information required for this purpose is formed and communicated according to the aforementioned ISDN Standards. Alternatively, which is not shown, the performance features are realized, that is, set up and controlled, in the ISDN communication terminal equipment KE.

Let it also be assumed for the exemplary embodiment that the ISDN subscriber TLN has changed his location to the further ISDN communication terminal equipment KEX and would like to modify the call redirection telephone number (represented by the performance feature setting information lei) in his ISDN communication terminal equipment KE such that call requests incoming at his ISDN communication terminal equipment KE, for example telephone calls, are redirected to the further ISDN communication terminal equipment KEX. To this end, the subscriber TLN inputs activation information aki and setting information esi at the further ISDN communication terminal equipment KEX (for example, using the keyboard thereof) and initiates a call setup to the ISDN communication terminal equipment KE (indicated with broken lines). Within the framework of the call set up and using an insertion routine ER, the activation information aki and the setting information esi are inserted into a user—user information element formed according to the prETS 300 286, Chap. 7.3, and user information element uui is inserted in the signaling information si. The signaling information si is communicated to the ISDN communication terminal equipment KE at its "proper" communication network connection SO via the ISDN communication network ISDN. Using a performance feature routine FLR, the two information aki,esi are stored in the controller ST in the ISDN communication terminal equipment KE. The setting information esi comprises a service information di that indicates the service, for example telephone service, comprises a performance feature information lmi that indicates the performance feature to be influenced, for example call redirecting, and comprises a performance feature setting information lei that indicates the setting to be influenced, for example the call redirection telephone number. After cleardown of the connection and also using the performance feature routine FLR, a signaling from the ISDN communication terminal equipment KE to the allocated ISDN communication system is automatically initiated by the activation information aki. The performance feature information lmi, the performance feature setting information lei as well as the service information di communicated from the further ISDN communication terminal equipment KEX are thereby inserted into the ISDN signaling information si and communicated to the allocated ISDN communication system KS. The controller ST of the ISDN communication system KS modifies the performance feature "call redirecting" according to the communicated information di, lmi, esi, that is, the call redirection telephone number for a specific service, for example the telephone service, with reference to the exemplary embodiment. When a call redirecting from the ISDN communication terminal equipment KE is to be initiated by the standardized "Call Deflection" procedure, then the service information di, the performance feature information lei and the setting information esi are to be locally stored in the ISDN communication terminal equipment KE.

Figure 2:
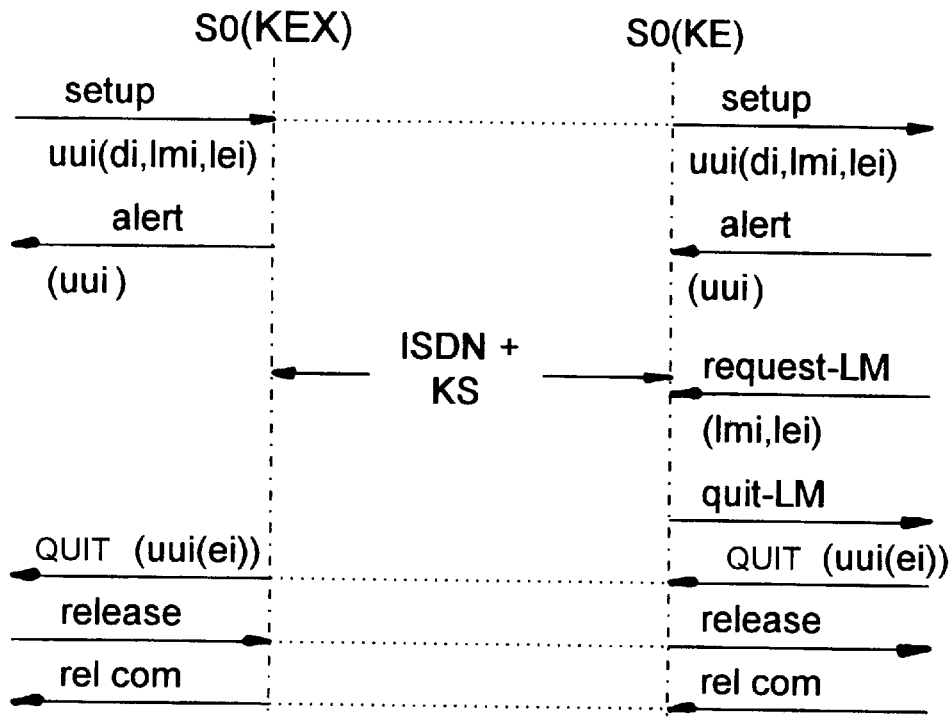
FIG. 2 is a flowchart showing a remote control of a performance features, for example, call redirection.

Alternatively, the modification of the performance feature is also possible during the connection of the further communication terminal KEX equipment-ISDN communication terminal equipment KE, whereby the service information di, the performance feature information setting information lei and the performance feature information lmi are communicated to the allocated ISDN communication system KS during the existing connection and the correct setting is immediately acknowledged (see FIG. 2).

In what is an essentially self-explanatory flowchart, FIG. 2 shows the inventive method for remote control modification of a performance feature, for example "call redirecting" in the telephone service for the ISDN communication terminal equipment KE, whereby the left-hand dot-dash line represents the further ISDN communication terminal equipment KEX, the right-hand dot-dash line represents the ISDN communication terminal equipment KE and the area lying therebetween represents the ISDN communication network ISDN including at least one ISDN communication system KS. Let it also be assumed that the performance feature is to be set or, respectively, modified at the "proper" ISDN communication network connection So, that is, in the allocated communication system KS. The modification of the performance feature "call redirecting" ensues within the framework of the call setup between the further ISDN communication terminal equipment KEX and the ISDN communication terminal equipment KE. A call setup message setup is communicated from the further ISDN communication terminal equipment KEX via the ISDN communication network ISDN to the ISDN communication terminal equipment KE, whereby performance feature information lmi and performance feature setting information lei is entered in the user—user information element uui that is co-communicated. The further ISDN communication terminal equipment KEX is informed of the recognition of the setting information esi by the signaling message alert communicated from the ISDN communication terminal equipment KE. Initiated by the activation information aki, a request IM signaling message that contains the setting information esi is communicated from the ISDN communication terminal equipment KE to the allocated ISDN communication system KS. After a successful setting or, respectively, modification of a performance feature in the ISDN communication system KS, for example modification of the redirection telephone number, this is confirmed by a quit LM signaling message. In response thereto, the ISDN communication terminal equipment KE initiates the cleardown of the connection, to which end the signaling messages discon, release and rel comp provided therefor are communicated. The successful or unsuccessful setting of the result information ei indicating the respective performance feature is also communicated with the discon message in a user—user information element uui that is formed according to prETS 300 286 and co-communicated. The signaling messages setup, alert, request-IM, quit-LM, discon, release, rel com shown in FIG. 2 represent signaling information si.

As a result of the inventive method, arbitrary performance features for ISDN communication terminal equipment KE can be remotely controlled at its "proper" ISDN communication network connection SO, that is, can be modified or reset from a further ISDN communication terminal equipment KEX of an ISDN communication network. Advantageously, the activation and setting information esi to be entered into the user—user information element uui is compressed or encoded, since the standardized user—user information element uui can communicate information covering only 32 bytes. Different codings can thereby be employed for the performance feature information lmi and the performance feature setting information lei. The coding information can, for example, be referred to identical tables from which the corresponding information lmi, lei are taken.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for remote control influencing of performance features for Integrated Services Digital Network (ISDN) communication terminal equipment in an ISDN communication network respectively connected to ISDN communication systems via an ISDN communication network connection, the method comprising the steps of:

controlling a call setup in the ISDN communication network for connections between ISDN communication terminals by signaling information communicated via the ISDN communication network connection;

initiating a call setup from a first ISDN communication terminal equipment to a second ISDN communication terminal equipment whose performance features are to be modified;

inserting a user—user information element into the signaling information, the user—user information element communicating at least setting information, that influences a respective service, and activation information to the second ISDN communication terminal equipment;

subsequently ending the call setup; and automatically initializing, by the activation information, the influencing of a respective performance feature of the respective service in the second ISDN communication terminal equipment corresponding to the communicated setting information.

2. The method according to claim 1, wherein initiated by the activation information, signaling information is automatically formed after call cleardown for influencing the performance features and is communicated to a communication system allocated thereto, information that is inserted into the user—user information element and that influences the performance features being formed according to the communicated setting information.

3. The method according to claim 2, wherein during a set up connection or in a framework of a call setup, the first ISDN communication terminal equipment is informed of a storing of the communicated setting information in the first ISDN communication terminal equipment by communicating result information inserted into a user—user information element of the signaling information.

4. The method according to claim 1, wherein initiated by the activation information, the respective performance feature is automatically influenced in the second ISDN communication terminal equipment after the call cleardown according to the communicated setting information.

5. The method according to claim 1, wherein initiated by the activation information and during a set up connection, signaling information is automatically formed for influencing the performance features and is communicated to a communication system allocated thereto, information that is inserted into the user—user information element and that influences the performance features being formed according to the communicated setting information.

6. The method according to claim 5, wherein during a set up connection or in a framework of a call setup the first ISDN communication terminal equipment is informed of the successful or unsuccessful setting of a performance feature by result information inserted into a user—user information element of the signaling information.

7. The method according to claim 1, wherein initiated by the activation information and during a set up connection, the respective performance feature is automatically influenced in the second ISDN communication terminal equipment according to the communicated setting information.

8. The method according to claim 7, wherein during a set up connection or in a framework of a call setup the first ISDN communication terminal equipment is informed of the successful or unsuccessful setting of a performance feature by result information inserted into a user—user information element of the signaling information.

9. The method according to claim 1, wherein the setting information is represented by service information that indicates a service affected, performance feature information that indicates a respective performance feature to be set, and performance feature setting information that indicates a setting of the respective performance feature.

10. The method according to claim 1, wherein the setting information is encoded for information compression, is communicated and is decoded in a predetermined communication terminal equipment.

11. The method according to claim 1, wherein the setting information relates to the performance feature of call redirecting in the telephone service, telephone service being defined by the service information, performance feature of call redirecting being defined by a first performance feature information and call redirection telephone number being defined by a second performance feature setting information.

12. Apparatus for remote control influencing of performance features for Integrated Services Digital Network (ISDN) communication terminal equipment in an ISDN communication network respectively connected to ISDN communication systems via an ISDN communication network connection, the apparatus comprising:

means in each of the ISDN communication terminal equipment for storing an insertion routine and a performance feature routine;

means for controlling a call setup in the ISDN communication network for connections between ISDN communication terminals by signaling information communicated via the ISDN communication network connection;

means for initiating a call setup from a first ISDN communication terminal equipment to a second ISDN communication terminal equipment whose performance features are to be modified;

means for inserting a user—user information element into the signaling information, the user—user information element communicating at least setting information, that influences a respective service, and activation information to the second ISDN communication terminal equipment;

means for subsequently ending the call setup; and means for automatically initializing, by the activation information, the influencing of a respective performance feature of the respective service in the second ISDN communication terminal equipment corresponding to the communicated setting information.

13. A method for remote control influencing of performance features for Integrated Services Digital Network (ISDN) communication terminal equipment in an ISDN communication network respectively connected to ISDN communication systems via an ISDN communication network connection, the method comprising the steps of:

controlling a call setup in the ISDN communication network for connections between ISDN communication terminals by signaling information communicated via the ISDN communication network connection;

providing setting information having service information that indicates a respective service affected;

providing performance feature information that indicates a respective performance feature to be set;

providing performance feature setting information that indicates the setting of the respective performance feature;

initiating a call setup from a first ISDN communication terminal equipment to a second ISDN communication terminal equipment whose performance features are to be modified;

inserting a user—user information element into the signaling information, the user—user information element communicating at least the setting information, that influences a respective service, and activation information to the second ISDN communication terminal equipment;

subsequently ending the call setup;

automatically initializing, by the activation information, the influencing of a respective performance feature of the respective service in the second ISDN communication terminal equipment corresponding to the communicated setting information;

automatically forming and communicating signaling information after call cleardown for influencing the performance features to a communication system allocated thereto; and forming information that is inserted into the user—user information element and that influences performance features according to the communicated setting information.

14. The method according to claim 13, wherein during a set up connection or in a framework of a call setup, the first ISDN communication terminal equipment is informed of a storing of the communicated setting information in the first ISDN communication terminal equipment by communicating result information inserted into a user—user information element of the signaling information.

15. The method according to claim 13, wherein initiated by the activation information and during a set up connection, signaling information is automatically formed for influencing the performance features and is communicated to the communication system allocated thereto, information that is inserted into the user—user information element and that influences the performance features being formed according to the communicated setting information.

16. The method according to claim 13, wherein during a set up connection or in a framework of a call setup the first ISDN communication terminal equipment is informed of the successful or unsuccessful setting of a performance feature by result information inserted into a user—user information element of the signaling information.

17. The method according to claim 13, wherein initiated by the activation information and during a set up connection, the respective performance feature is automatically influenced in the second ISDN communication terminal equipment according to the communicated setting information.

* * * * *